United States Patent

Hoepker et al.

[11] Patent Number: 5,261,770
[45] Date of Patent: Nov. 16, 1993

[54] NAIL FASTENER ASSEMBLY

[75] Inventors: Elmer C. Hoepker, Planken; Hans Hachtel, Schaan; Horst D. Gassmann, Ruggell, all of Liechtenstein

[73] Assignee: Hilti Aktiengesellschaft, Furstentum, Liechtenstein

[21] Appl. No.: 962,759

[22] Filed: Oct. 19, 1992

[30] Foreign Application Priority Data

Oct. 28, 1991 [DE] Fed. Rep. of Germany ....... 4135500

[51] Int. Cl.⁵ .................. F16B 15/00; F16B 15/02
[52] U.S. Cl. ................... 411/441; 411/480; 411/923
[58] Field of Search ............ 411/440, 441, 480, 482, 411/544, 923

[56] References Cited

U.S. PATENT DOCUMENTS

| 3,921,495 | 11/1975 | Braun et al. | 411/441 |
| 4,802,802 | 2/1989 | Thurner | 411/480 X |
| 4,915,561 | 4/1990 | Buhri et al. | 411/441 X |
| 4,948,312 | 8/1990 | Jochum | 411/441 X |
| 5,054,983 | 10/1991 | Froewis et al. | 411/480 |

Primary Examiner—Neill R. Wilson
Attorney, Agent, or Firm—Anderson Kill Olick & Oshinsky

[57] ABSTRACT

A nail fastener assembly for attaching thin metal sheets includes an axially extending nail with a conically shaped shank having ballistic-like tip at its leading end and a head at its trailing end. A disk is fitted on the leading end of the shank with a sleeve secured on the shank between the disk and the head. When the nail is driven by a setting tool, the sleeve acts on the disk in the region of the tip, so that the transmission of all forces acts on an annular radially outer surface on the leading surface of the disk. The leading end surface of the disk has a radially inner conically shaped first recess and an annular second recess encircling the outer edge of the first recess and spaced inwardly from the radially outer edge of the disk. Accordingly, the radially outer contact surface bears against the metal sheet being attached and provides high transverse stresses.

6 Claims, 1 Drawing Sheet

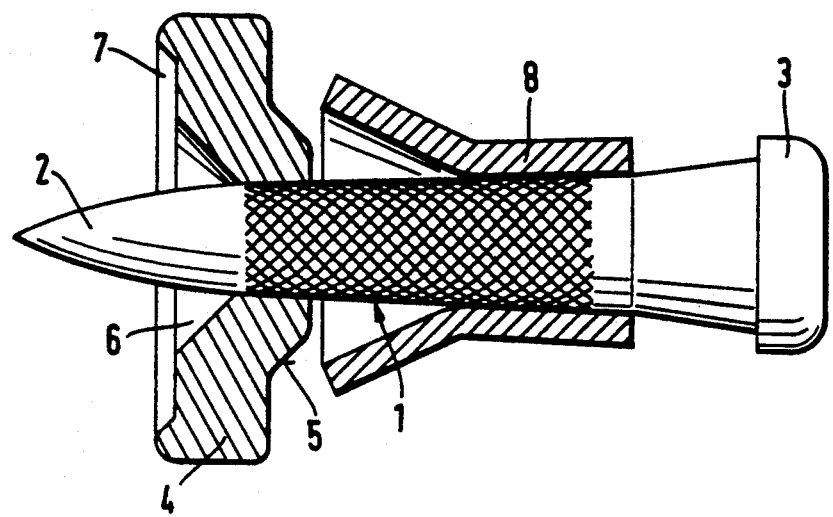
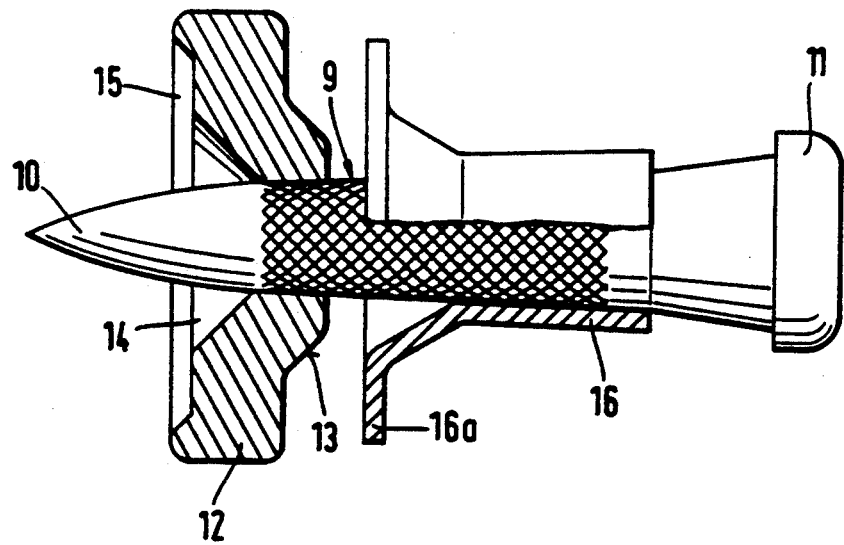

NAIL FASTENER ASSEMBLY

BACKGROUND OF THE INVENTION

The invention is directed to a nail fastener assembly including a nail with an axially extending conically shaped shank, a ballistic-like tip at the leading end of the shank and a head at the trailing end with a disk and a sleeve located on the shank that is, an ogival-shaped tip.

Nails with a conically shaped shank are known for attaching thin metal sheets such as in DE 32 37 528 C2, where the shank has two dish-shaped disks arranged one after the other. Further, it is known from DE 37 43 049 A1 to position a disk in the region of the tip and a sleeve on the shank.

The serially arranged disks compensate for the strength of an initially adjusted propellant charge where different driving resistances exist. In the case of the disk and sleeve, the sleeve affords adequate pressure of the sheet metal against the support or base object. Problems arise in certain applications in that when the disk or the sleeve strikes the metal sheet, deformation develops at the edge regions of the sheet metal being attached, whereby when a load is applied, it can result in different types of destruction of the metal sheet and the connection.

SUMMARY OF THE INVENTION

Therefore, the primary object of the present invention is to eliminate the disadvantages experienced in the past when attaching thin metal sheets and to establish a lasting and strong attachment of the metal sheets as well as assuring high load capacities with regard to transverse tension stress.

In accordance with the present invention, a disk is positioned in the region of the tip of the nail and a sleeve is located between the disk and the head with the disk having a greater stiffness than the sleeve.

Due to the different stiffnesses of the sleeve and the disk, it is achieved that the resulting elastic stress of the assembly is used as a contact pressure force acting on the metal sheet being attached. Because of the greater stiffness of the disk, its entire radially outer contact surface is available for transmitting the contact pressure, whereby high transverse stress values are attained.

Due to a conically tapering surface on the disk facing towards the head with a corresponding conically shape inside surface in the sleeve, the surfaces of the two elements slide one on the other when the sleeve is driven toward the disk. The elastic clamping or stress developed as a result of the different stiffnesses of the two elements, affords a strong and effective attachment of the metal sheet.

Further, the surface of the disk facing in the leading direction, or towards the tip, is recessed inwardly and takes into account the arching of the base or support and the metal sheet occurring during the driving process. Preferably, the recess on the leading surface of the disk forms a circular ring-shaped edge or contact surface on the radially outer edge of the disk, so that upward arching increasing the lateral tension on tensile stress arises on both sides of the edge. This feature creates a kind of positive lock between the disk and the metal sheet.

Finally, effective operation in a device for driving the nails, particularly with regard to guidance, assumes that the outer diameter of the sleeve is preferably not greater than the outer diameter of the disk. Moreover, this dimensional feature assures that the stress produced by the sleeve acts on the radially outer region of the disk and is decisive for achieving high transverse stresses.

The flexural forces produced amount generally to the range of 500 to 2,000 N, N is short for Newton and effect a sure retention of the metal sheet, without any malfunctions occurring due to local deformations, whereby malfunctions and interferences under dynamic loads and shock loads are avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a nail fastener assembly embodying the present invention and including a nail mounting a disk and a sleeve; and FIG. 2 is a view similar to FIG. 1 displaying another embodiment of the sleeve.

DETAILED DESCRIPTION OF THE INVENTION

In FIG. 1 a nail fastener assembly is shown where the various parts of the assembly have a leading end on the left and a trailing end on the right. The nail fastener assembly includes an axially extending nail with a conically shaped shank 1 having a ballistic-like or ogival-shaped, tip 2 at its leading end and a head 3 at its trailing end extending transversely outwardly from the shank. Shank 1 can have different cone angles as shown diagrammatically in FIG. 1 with the shank tapering outwardly from the tip 2 toward the head 3. Adjacent the head 3, the shank has a greater cone angle than the part extending from the tip.

Fitted on the leading end of the shank 1 is a disk 4 with the disk projecting in the leading end direction from the shank. At its trailing end surface, the disk has a conically shaped surface 5 tapering inwardly towards the head 3. The surface 5 extends between a pair of surfaces extending transversely of the axial direction of the nail. On its leading end surface, the disk has a radially inner conically shaped first recess 6 tapering outwardly in the leading end direction and a second recess 7 having a countersunk appearance encircles the radially outer leading end of the first recess 6 so that an annular contact surface remains between the radially outer edge of the second recess 7 and the radially outer edge of the disk 4. The second recess 7 has an area facing toward the leading end of the nail which is less than 0.9 times the contact area afforded by the disk.

A sleeve 8 is positioned on the shank 1 between the disk 4 and the head 3. Initially, as shown, the sleeve 8 is axially spaced from the disk and from the head. From its leading end, the sleeve 8 is conically shaped tapering inwardly toward the head into contact with the shank. The leading conically shaped section of the sleeve corresponds generally to the conically shaped surface 5 of the disk and is spaced radially outwardly from the shank.

In FIG. 2, the nail fastener assembly includes a nail with a conically shaped shank 9 having a ballistic-like or ogival-shaped tip 10 at its leading end and a head 11 at its trailing end. The shank 9 of the nail in FIG. 2 can have axially extending surfaces with different cone angles and may also be knurled as shown in FIGS. 1 and 2. A disk 12 is positioned on the leading end of the shank 9 adjacent the tip 10. The trailing end surface of the disk 12 has a conically shaped surface 13 tapering inwardly towards the head 11. The leading end surface of the disk facing the tip 10 has a conically shaped first recess 14 tapering outwardly toward the leading end surface and a second recess 15 laterally encircling the first recess and having an area such as the second recess 7 in FIG. 1.

A sleeve 16 is located on the shank 9 between the disk 12 and the head 11. Sleeve 16 has a conically shaped inside surface extending from its leading end towards its trailing end. The leading end of the sleeve has a radially outwardly extending flange 16a. In FIG. 1 and FIG. 2, the leading end of the sleeve has the maximum diameter of the sleeve which does not exceed the radially outer diameter of the disk 12.

The nails shown in FIGS. 1 and 2 have the same function when used for attaching thin metal sheets. When the nail is being driven in, such as by an explosive powder charge operated setting tool, not shown, the sleeve 8, 16 is carried in the leading end direction on the conically shaped shank and moves against the disk 4, 12 now resting on the metal sheet, not shown, to be attached. Depending on the available energy produced by the setting tool, there is a more-or-less pronounced deformation of the sleeve 8, 16. Due to the conically shaped inside surface of the sleeve 8, 16, a transmission of all the forces acts on the radially outer circumferential surface of the disk 4, 12. As a result, in combination with the interrelationship of the stiffness of the disk 4, 12 compared to the lesser stiffness of the sleeve 8, 16, the metal sheet being attached is held down by the radially outer circumferential contact surface of the disk 4, 12 and results in the desired high transfer stress values.

While the invention has been illustrated and described as embodied in a nail fastener assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. Nail fastener assembly comprising an axially elongated nail having a leading end and a trailing end, said nail having an axially extending conically shaped shank with an ogival-shaped tip at the leading end and a head extending transversely outwardly from said shank at the trailing end, said shank tapering outwardly from said tip towards said head, a disk and an axially extending sleeve located on said shank, wherein the improvement comprises that said disk is located on said shank adjacent said tip and said sleeve is located on said shank between said disk and said head, and said disk has a greater stiffness than said sleeve.

2. Nail fastener assembly, as set forth in claim 1, wherein a surface of said disk facing toward the trailing end and an inside surface of said sleeve facing toward the leading end have matching conically shaped surfaces.

3. Nail fastener assembly, as set forth in claim 1 or 2, wherein the surface of said disk facing toward the leading end has a conically shaped first recess with the diameter thereof increasing in the leading end direction.

4. Nail fastener assembly, as set forth in claim 3, wherein the surface of the disk facing toward the leading end has a second recess laterally encircling the first recess and located inwardly from the radially outer edge of said disk and having an area facing in the leading end direction which is less than 0.9 times a contact area formed between the radially outer edge of the second recess and the radially outer edge of said disk.

5. Nail fastener assembly, as set forth in claim 4, wherein said sleeve has a maximum outside diameter not greater than the maximum outside diameter of said disk.

6. Nail fastener assembly, as set forth in claim 4, wherein when said fastener assembly is driven to attach thin metal sheets said sleeve applies a flexural force in the range of 500 to 2,000 N.

* * * * *